United States Patent [19]
Pizzirusso et al.

[11] Patent Number: 5,504,282
[45] Date of Patent: Apr. 2, 1996

[54] SOUND TRANSMISSION AND ABSORPTION CONTROL MEDIA

[75] Inventors: Joseph F. Pizzirusso, Springfield; John R. Rucker, Norwood, both of Pa.

[73] Assignee: Foamex L.P., Linwood, Pa.

[21] Appl. No.: 295,257

[22] Filed: Aug. 24, 1994

[51] Int. Cl.⁶ ........................................... E04B 1/82
[52] U.S. Cl. ............................... 181/290; 181/294
[58] Field of Search ........................ 181/290, 286, 181/294, 208; 428/95

[56] References Cited

U.S. PATENT DOCUMENTS

| | | |
|---|---|---|
| 4,191,798 | 3/1980 | Schumacher et al. |
| 4,367,259 | 1/1983 | Fulmer et al. |
| 4,488,619 | 12/1984 | O'Neil ................................ 181/290 |
| 4,508,771 | 4/1985 | Peoples, Jr. et al. .................. 428/95 |
| 4,579,764 | 4/1986 | Peoples, Jr. et al. .................. 428/95 |
| 4,825,974 | 5/1989 | Hoffmann et al. .................. 181/290 |
| 4,966,799 | 10/1990 | Lucca et al. .......................... 428/95 |

*Primary Examiner*—Khanh Dang
*Attorney, Agent, or Firm*—Connolly and Hutz

[57] ABSTRACT

The present invention relates to sound transmission barrier and/or sound absorption media systems that are especially useful in motor vehicles and boats. These systems are based on the concept of replacing the traditional intermediate high-mass layer ("massback") with two or more high-mass layers that are separated by a strong yet light material, such as polyurethane foam.

22 Claims, 1 Drawing Sheet

SOUND TRANSMISSION AND ABSORPTION CONTROL MEDIA

BACKGROUND OF THE INVENTION

1. Field of the Invention

The present invention relates to sound transmission barriers and sound adsorption media systems that are especially useful in motor vehicles and boats.

2. Description of the Prior Art

The standard sound transmission barrier system used in motor vehicles and boats relies on a multi-layered structure that has either one or two intermediate layers of an impermeable (i.e., to air) material with a high mass per unit area. When two intermediate layers are used, the intermediate layers are in direct contact with each other in the final barrier system. The intermediate layer(s) is(are) sandwiched between a relatively soft lower layer and an upper layer that is exposed to the environment.

Traditionally, the lower layer contacts the inner surface of the structural skin of the motor vehicle or boat (e.g., the sheet metal of an automobile or the wood, metal or fiberglass hull of a boat). The lower layer is usually formed from an inexpensive fibrous material, such as "shoddy" (a layered material composed primarily of textile scraps and manufactured by a number of companies, including Jamesville Products Company and Chris Craft Company).

Usually the intermediate layers are formed from a thermoformable material. "Massback" has been widely used in the automobile industry for this purpose. A relatively dense material, normally impermeable to air and thermoformable, massback can be formed from virtually any plastic or rubber material which contains a high-mass filler material. The preferred composition of massback includes EVA (ethylene-vinylacetate copolymer), polyethylene, PVC (polyvinylchloride) or tar as the base thermoplastic material, and a high-mass filler material, such as calcium carbonate or barium sulfate, added to increase the mass.

The upper layer of the traditional sound transmission barrier is either carpet or some other surface material that may be exposed to the environment (e.g., vinyl or a plastic material). When the lower, intermediate and upper layers are arranged in the manner indicated above, they provide a sound transmission barrier which reduces the amount of outside noise that would otherwise reach the cabin interior of the motor vehicle or boat.

Although the prior art sound transmission barrier systems are effective in reducing the amount of outside noise that reaches the interior of the motor vehicle or boat, there has been a long-felt need to reduce the overall weight of the systems without decreasing the effectiveness of the systems as sound transmission barriers and/or sound absorption media. This need has been satisfied by the sound transmission barrier and sound absorption media systems of the present invention.

SUMMARY OF THE INVENTION

Figure 1:
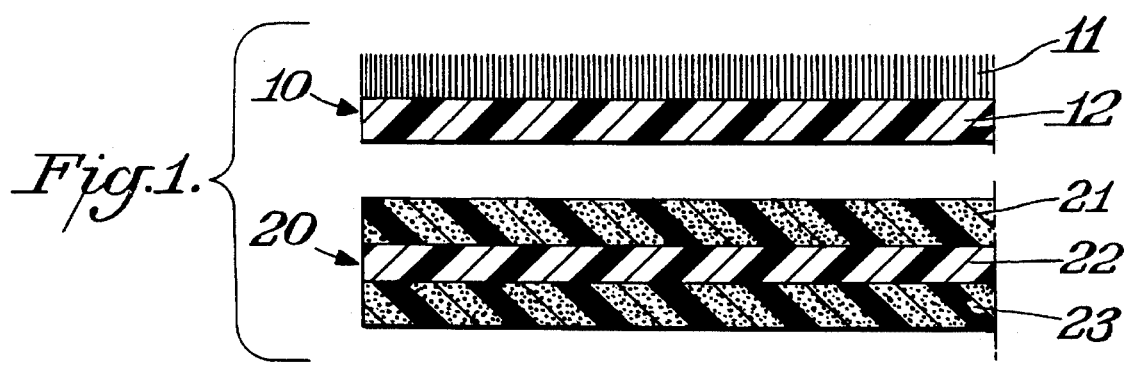
FIG. 1 is a cross sectional view of a sound transmission barrier and/or sound absorption media of the present invention which is composed of two separate pieces or "shells".

The present invention relates to sound transmission barrier and/or sound absorption media systems that are especially useful in motor vehicles and boats. The traditional high-mass intermediate layer of prior systems is replaced by two or more layers. These intermediate layers are separated by a strong yet light material, such as polyurethane foam or rebonded polyurethane foam. In a particularly preferred embodiment of the present invention, the lower layer of the traditional sound transmission barrier system ("shoddy") is replaced with a layer of foam, such as polyurethane foam or rebonded polyurethane foam.

In the present application, the phrase "mass per unit area" is used to describe several of the materials that make up the sound transmission barriers and/or sound absorption media. This phrase is used in the art to refer to the mass of materials which are in the form of thin sheets. To determine the mass per unit area of such a material, a piece of the material having a measured surface area (i.e., the area of either the upper surface or the lower surface of the sheet material, but not the total surface area) is weighed to determine its mass. This mass is then divided by the measured surface area to determine the mass per unit area.

In a preferred embodiment of the present invention, the high-mass intermediate layer of the traditional sound transmission barrier system is replaced by two intermediate layers that are separated by a layer of a strong yet light material, such as polyurethane foam or rebonded polyurethane foam. The total mass per unit area of the system consisting of the two separated layers and the foam often can be less than that of the traditional intermediate layer. Further, the reduction in the mass per unit area in the sound transmission barrier systems of the present invention does not result in a reduction of the effectiveness of the system as a sound transmission barrier and/or sound absorption media. For a given sound transmission reduction value, the total mass per unit area of the barrier system of the present invention is less than that of the traditional prior art barrier system. This barrier system with foam separating the intermediate layers also has desirable sound absorption characteristics within the passenger cabin of the vehicle or boat.

DESCRIPTION OF THE PREFERRED EMBODIMENTS

The present invention relates to sound transmission barrier and/or sound absorption media systems that are especially useful in motor vehicles and boats. These systems are based on the concept of replacing the traditional high-mass intermediate layer with two or more intermediate layers that are separated by a strong yet light material, such as polyurethane foam or rebonded polyurethane foam. In addition, in a particularly preferred embodiment of the present invention, the lower layer of the traditional sound transmission barrier system ("shoddy") is replaced with a layer of foam.

In a preferred embodiment of the present invention, the high-mass intermediate layer of the traditional sound transmission barrier system is replaced by two layers that are separated by a layer of a strong yet light material, such as polyurethane foam or rebonded polyurethane foam. The total mass per unit area of the system consisting of the two separated layers and the foam often can be less than that of the traditional intermediate layer if there is one intermediate layer. For example, if the traditional sound transmission barrier system uses an intermediate layer which has a mass per unit area value of 1.2 lbs/ft$^2$, the present invention would replace this intermediate layer with two layers, separated by a layer of foam, where the total combined mass per unit area of the two separated layers and the foam layer would be less than 1.2 lbs/ft$^2$. As an additional example, if the traditional sound transmission barrier system uses two intermediate layers (e.g., one having a mass per unit area of 0.6 lbs/ft$^2$ and the other having a mass per unit area of 0.7 lbs/ft$^2$) having a total mass per unit area of 1.3 lbs/ft$^2$, the present invention would replace the two intermediate layers with two different layers that are separated by a layer of foam, where the total combined mass per unit area of the two separated layers and the foam layer would be less than 1.3 lbs/ft$^2$. Further, the reduction in the mass per unit area in the sound transmission barrier and/or sound absorption media systems of the present invention does not result in a significant reduction of the effectiveness of the system as a sound transmission barrier or sound absorption medium. For a given sound transmission reduction value, the total mass per unit area of the barrier system of the present invention is less than that of the traditional barrier system.

Figure 2:
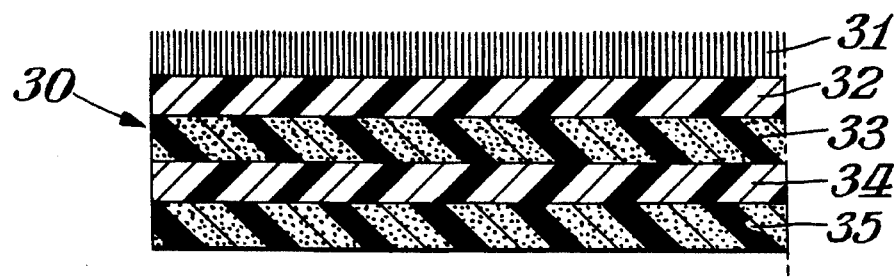
FIG. 2 is a cross sectional view of a one piece sound transmission barrier and/or sound absorption media of the present invention.

Referring to FIG. 2, in a particularly preferred embodiment of the present invention, the sound transmission barrier system 30 consists essentially of: (1) an upper layer 31 composed of, for example, carpet, vinyl or plastic; (2) a first intermediate layer 32 composed of, for example, massback; (3) a separation layer 33 composed of, for example, foam; (4) a second intermediate layer 34 composed of, for example, massback; and (5) a lower layer 35 composed of, for example, foam or shoddy.

This barrier system can also be composed of two or more separate pieces (sometimes referred to as "shells") that are installed separately from each other. For example, as shown in FIG. 1, the barrier system could be separated into two pieces or "shells" wherein the upper shell 10 could be composed of the upper layer 11 and the first intermediate layer 12. The lower shell 20 would then be composed of the separation layer 21, the second intermediate layer 22 and the lower layer 23. The lower shell 20 is installed in the vehicle or boat first with the lower surface of the lower layer 23 in contact with the vehicle or boat. Next, the upper shell 10 is installed atop the lower shell 20 so the intermediate layer 12 contacts the separation layer 21. The upper shell 10 normally is positioned atop the lower shell 20 without any applied adhesive or fastening means. Although it may be necessary or desirable in certain applications to separate a barrier system of significant weight into two or more pieces or "shells" to facilitate the installation or handling of the system, it is preferred that the barrier system be in one piece wherein each layer is attached or adhered to the adjacent layer or layers.

The upper layer 11, 31 can be composed of any material that is used as a surface material on the interior of a motor vehicle or boat. For example, when the upper layer is used on the floor of the motor vehicle or boat, the material would traditionally be carpet. When the upper layer is used on the doors or side panels of a motor vehicle or boat, the material would traditionally be either carpet, vinyl or plastic. When the upper layer is used on the dashboard of a motor vehicle or boat, the material would traditionally be vinyl or plastic.

The upper layer 11, 31 is normally attached to the first intermediate layer 12, 32 by extrusion laminating (i.e., by bringing either the top or bottom, or both, surfaces of the semi-solidified first intermediate layer from the extruder in contact with the material to be laminated while pressure is applied) or through the use of an adhesive, such as a contact adhesive that contains about 18% vinyl acetate. For example, when the upper layer 11, 31 is carpet and the first intermediate layer 12, 32 is a massback material composed of EVA containing a high-mass filler material, the massback material can be extruded at a temperature below about 400° F., preferably at a temperature of from about 300° to 350° F. When it is desired to mold the EVA containing system, the preferred temperatures at which the molding is conducted is from about 200° to 275° F. While the massback is still in a tacky state, the carpet may be pressed or nipped to the massback surface to bond the carpet thereto.

The first intermediate layer 12, 32 can be composed of any material that is impermeable to air and has a relatively high mass per unit area. Preferably, the material is also thermoformable. The preferred mass per unit area of the first intermediate layer 12, 32 is from about 0.06 to 2.0 lbs/ft$^2$. A particularly preferred material for the first intermediate layer is "massback", which is a combination of a plastic material containing a high-mass filler material. In the preferred embodiments of the present invention, the massback is composed of EVA (ethylene-vinylacetate copolymer), polyethylene, PVC (polyvinylchloride) or tar as the base thermoplastic material with a high-mass filler material, such as calcium carbonate or barium sulfate, added to increase the mass. A suitable massback product comprised of EVA containing calcium carbonate is offered by E.I. dupont de Nemours & Company under the trademark "KELDEX."

The separation layer 21, 33 can be composed of any strong yet light material such as foam. Preferably, the material is also thermoformable. A particularly preferred separation layer 21, 33 is composed of a polyurethane foam having a density of from about 0.6 to 10.0 lbs/ft$^3$. A rebonded polyurethane foam with a foam density in this range is also suitable.

The second intermediate layer 22, 34 can be composed of the same material as the first intermediate layer 12, 32 or a different material. Further, the mass per unit area of the second intermediate layer 22, 34 can be the same as or different from the mass per unit area of the first intermediate layer 12, 32. In one embodiment of the present invention, the second intermediate layer 22, 34 is composed of the same material as the first intermediate layer 12, 32 and has about the same mass per unit area as the first intermediate layer (i.e., the preferred mass per unit area of the second intermediate layer is from about 0.06 to 2.0 lbs/ft$^2$). In certain cases, it may be desirable to use a second intermediate layer with a mass per unit area different from the first intermediate layer.

The lower layer 23, 35 can be composed of any material that is relatively soft, flexible and air permeable. Preferably, the lower layer is composed of a material that has a relatively low mass per unit area and can be thermoformable. Such materials include foams, such as polyurethane foams and rebonded polyurethane foams, fiberglass, foamed rubbers, shoddy, felts and other nonwoven materials. Particularly preferred materials are foam (especially polyurethane foam) and shoddy.

The combination of the first intermediate layer 12, 32, the separation layer 21, 33 and the second intermediate layer 22, 34 effectively separates the traditional prior art intermediate layer into two intermediate layers that are not in contact with each other and usually results in a barrier system that has a lower mass per unit area. That is, the total mass per unit area of the separated intermediate layers and the separation layer is less than the total mass per unit area of the traditional intermediate layer. The combination of the present invention is at least as effective as the traditional prior art barrier system in reducing sound transmission. It is also effective as a sound absorption media system for the passenger cabin interior of the vehicle or boat.

This concept of replacing the traditional intermediate layer with multiple intermediate layers that do not contact each other and have a total mass per unit area less than the traditional intermediate layer can be extended to systems wherein the traditional intermediate layer is replaced with more than two separate intermediate layers. For example, the traditional intermediate layer could be replaced by three intermediate layers separated by two separation layers. Such a barrier system of intermediate layers separated by separation layers could be extended indefinitely to further reduce the overall weight of the system or further increase the effectiveness of the system as a sound transmission and or sound absorption barrier.

The thickness of the sound transmission barriers of the present invention will depend on the level of sound transmission reduction that is desired. As the thickness of the sound barriers increases, the level of sound transmission reduction increases. However, for most uses, especially in vehicles and boats, it is impractical to install a sound barrier having a thickness greater than about 2.5 inches. In a preferred embodiment of the present invention, the sound transmission barriers 30 have a thickness in the range of from about 0.1 to 2.5 inches. In a particularly preferred embodiment of the present invention, the sound transmission barriers have a thickness which is in the range of from about 0.25 to 2.5 inches. In the most preferred embodiment of the present invention, the sound transmission barriers have a thickness of from about 0.25 to 1.5 inches.

When foam is used as the separation layer and/or the lower layer of the sound transmission barrier/sound absorption media, the foam can be virgin foam or rebonded recycled foam. The foam should preferably have a density of from about 0.6 to 10 lbs/ft$^3$. The most preferred foam for the sound barrier systems of the present invention is polyurethane foam. In a preferred embodiment of the present invention, the foam also has an IFD$_{25}$ of from about 10 to 200. The IFD of a foam is measured by the Indentation Force Deflection Test and the "IFD$_{25}$" numbers indicated above are "rest" values. That is, the force needed to compress the foam sample 25% of its initial thickness after being held in that position for one minute. The loading platen that is used in the test has a circular area of 50 in$^2$.

The present invention also includes the sound transmission barrier and/or sound absorption media systems in molded (i.e., thermoformed) form. Specifically, after the sound transmission barrier system has been formed, or during its formation, the system can be thermoformed to a particular shape or configuration that is desired for a particular end use. For example, the system could be thermoformed so as to conform to the shape of the floor of a particular automobile model. Moreover, if the sound transmission barrier system of the present invention is in two or more pieces or "shells", it may only be necessary to thermoform some of the pieces rather than all of the individual pieces. For example, some of the pieces may be inherently conformable and therefore do not need to be thermoformed.

To determine the sound transmission properties of the barrier systems of the present invention, one of the following procedures is used. According to the SAE J1400 standard, a source room and a receiver room are separated by a partition. There is a microphone in each room so that sounds generated in the source room may be measured in the source room and in the receiver room. First, a reference or control sample, such as a sheet of lead, is mounted in the test fixture in the partition between the two rooms. Sounds are generated in the source room and the third octave band levels in both the source and receiver rooms are measured and recorded for the testing bands. Next, a test sample is mounted in the test fixture and the third octave band levels are again measured and recorded in both the source and receiver rooms. The measured noise reduction (dB) and sound transmission loss (dB) for the control sample and the test sample can then be calculated.

With a modified ASTM E90 procedure, like the SAE J1400 standard procedure, a test sample is again mounted in a test fixture in the partition between a source room and a receiver room. Sound generated in the source room is measured in both the source room and the receiver room. The noise reduction (dB) is calculated.

To determine the sound absorption properties of the barrier systems of the present invention, the impedance tube method ASTM C384 was employed. According to this procedure, a test specimen is placed in the closed end of a generally hollow tube of uniform cross section and fixed length. A single tone of selectable frequency is generated from the open end of the tube toward the specimen. Waves of reduced amplitude are reflected by the specimen and combine with incident waves to form a standing wave pattern along the tube. A moveable microphone or probe explores the standing wave pattern in front of the specimen. The measurements are repeated for a number of sound frequencies. From this data the normal incidence sound absorption coefficient and the specific normal acoustic impedance of the specimen may be determined.

When the sound transmission barrier and/or sound absorption media systems of the present invention are to be used in automobiles, it may be advantageous to use different sound barrier systems in the different sections of the automobile. For example, it may be desirable to use one sound barrier system underneath the carpet that is located below and in front of the front seats and another sound barrier system underneath the carpet that is located in front of the back seats. Therefore, it should be understood that several different sound barrier systems could be used in one vehicle and that one or more of these different systems could be the sound transmission barrier systems of the present invention.

In certain end uses, it may be desirable for the sound transmission barrier and/or sound absorption media systems of the present invention to include a heat dissipation layer that would be located directly under the lower layer. For example, a layer of heavy duty aluminum foil could be bonded to the lower surface of the lower layer of the barrier system. This heat dissipation layer could be used to either reflect heat coming from the outside of the motor vehicle or boat, or to spread out the heat generated by any local hot spots on the outer skin of the motor vehicle or boat (e.g., directly above the catalytic converter or exhaust pipe of an automobile or directly above or next to the engine compartment in a boat).

The following examples will aid in explaining, but should not be deemed as limiting, the practice of the present invention. In all cases, unless otherwise noted, all parts and percentages are by weight.

Example 1

A two piece sound transmission barrier system for an automobile composed of an upper shell and a lower shell was obtained by the following process. Refer also to FIG. 1. Initially, the upper shell 10 was produced by extrusion bonding an upper layer 11 consisting of carpet material to the upper surface of a first intermediate layer 12 composed of about 0.5 lb/ft$^2$ an EVA-based massback material such as KELDEX, which contains approximately 22% EVA and 78% calcium carbonate.

The lower shell 20, which has a separation layer 21 (0.25 inch thick polyurethane foam), a second intermediate layer 22 of about 0.4 lb/ft$^2$ of an EVA-based massback, such as KELDEX, and a lower layer 23 (0.25 inch thick polyurethane foam), was produced by bonding the separation layer 21 and the lower layer 23 to the upper and lower surfaces, respectively, of the second intermediate layer 22 with a 3M contact adhesive.

The polyurethane foam that was used in the barrier system of the present example was produced by the following process. A polyol mixture was prepared from 30 parts of a polyether polyol (Voranol 3010—Dow) and 70 parts of a copolymer polyol (Voranol 3943—Dow). The polyol mixture (100 total parts) was reacted with 36.8 parts of TDI (toluene diisocyanate), 2.75 parts water, 0.14 parts tin catalyst (i.e., stannous octoate catalyst C-2 from Witco Corp.), 0.4 parts amine catalyst (C124—Niax A-1, a proprietary tertiary amine product of Air Products, in dipropylene glycol in a ratio of 1:6), and 1.0 parts of a silicone surfactant (L620 from OSi—a copolymer of polyether and polysiloxane). The isocyanate index was 115 (i.e., a 15% excess of isocyanate over the stoichiometric amount).

All of the above ingredients were combined in a mixing chamber and agitated at high speed to form a reactive mixture. This reactive, foam-forming mixture was then discharged or dispensed from the mixing chamber onto a moving casting conveyor and allowed to rise and cure into the final foam product at ambient temperature and pressure. The resulting polyurethane foam had a density of about 2.1 lbs/ft$^3$ and an IFD$_{25}$ of about 90, but could have been formed to have an IFD$_{25}$ in the range of between about 70 and 120.

Example 2

Referring also to FIG. 2, a one piece sound transmission barrier system 30 for an automobile was produced by first extrusion bonding an upper layer 31 consisting of carpet material to the upper surface of a first intermediate layer 32 composed of about 0.5 lb/ft$^2$ of an EVA-based massback material, such as KELDEX, which contains approximately 22% EVA and 78% calcium carbonate. The lower surface of the first intermediate layer 32 was then adhesive-bonded to the upper surface of a system composed (from top to bottom) of a separation layer 33 (0.25 inch thick polyurethane foam), a second intermediate layer 34 composed of about 0.4 lb/ft$^2$ of an EVA-based massback material, such as KELDEX, and a lower layer 35 (0.25 inch thick polyurethane foam) wherein the separation layer 33 and the lower layer 35 were bonded to the upper and lower surfaces, respectively, of the second intermediate layer 34 using a 3M contact adhesive.

The polyurethane foam was used in the barrier system of the present example was produced by the same process as described for the foam used in Example 1 above.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A sound transmission barrier system, comprising: attached layers wherein an upper layer having an upper surface and a lower surface is formed from a carpet material;

a first intermediate layer having an upper surface and a lower surface is formed from a high mass base thermoplastic material and is attached to the lower surface of the carpet material;

a separation layer having an upper surface and a lower surface is formed from polyurethane foam and is attached to the lower surface of the first intermediate layer;

a second intermediate layer having an upper surface and a lower surface is formed from a high mass base thermoplastic material and is attached to the lower surface of the separation layer; and a lower layer having an upper surface and a lower surface is formed from polyurethane foam or shoddy or fiberglass and is attached to the lower surface of the second intermediate layer.

2. The sound transmission barrier system of claim 1, wherein the upper layer comprises a vinyl or plastic sheet material.

3. The sound transmission barrier system of claim 1, wherein the second intermediate layer has a different mass per unit area than the first intermediate layer.

4. The sound transmission barrier system of claim 1, wherein the first intermediate layer comprises a base thermoplastic material containing a high mass filler.

5. The sound transmission barrier system of claim 1, wherein the second intermediate layer comprises a base thermoplastic material containing a high mass filler.

6. The sound transmission barrier system of claim 1, wherein the high mass base thermoplastic material comprises at least one material selected from the group consisting of EVA (ethylene-vinylacetate copolymer), polyethylene, PVC and tar.

7. The sound transmission barrier system of claim 1, wherein the lower surface of the lower layer is placed in contact with the structural skin of a motor vehicle.

8. The sound transmission barrier system of claim 1 wherein the lower surface of the lower layer is attached to the structural skin of a motor vehicle.

9. A multiple-piece sound transmission barrier system, comprising:

an upper shell and a lower shell, wherein an upper layer having an upper surface and a lower surface is formed from a carpet material;

a first intermediate layer having an upper surface and a lower surface is formed from a high mass base thermoplastic material and is attached to the lower surface of the carpet material to form the upper shell; and a separation layer having an upper surface and a lower surface is formed from polyurethane foam;

a second intermediate layer having an upper surface and a lower surface is formed from high mass base thermoplastic material and is attached to the lower surface of the separation layer; and a lower layer having an upper surface and a lower surface is formed from polyurethane foam or shoddy or fiberglass and is attached to the lower surface of the second intermediate layer to form the lower shell with the separation layer, the second intermediate layer so that the sound transmission barrier system is formed when the lower shell and the upper shell are placed adjacent to one another with the upper surface of the separation layer in contact with the lower surface of the first intermediate layer.

10. The multiple-piece sound transmission barrier system of claim 9, wherein the upper layer comprises a vinyl or plastic sheet material.

11. The multiple-piece sound transmission barrier system of claim 9, wherein the second intermediate layer has a different mass per unit area than the first intermediate layer.

12. The multiple-piece sound transmission barrier system of claim 9, wherein the first intermediate layer comprises a base thermoplastic material containing a high mass filler.

13. The multiple-piece sound transmission barrier system of claim 9, wherein the second intermediate layer comprises a base thermoplastic material containing a high mass filler.

14. The multiple-piece sound transmission barrier system of claim 9, wherein the high mass base thermoplastic material comprises at least one material selected from the group consisting of EVA (ethylene-vinylacetate copolymer), polyethylene, PVC and tar.

15. The multiple-piece sound transmission barrier system of claim 9, wherein the lower surface of the lower layer is attached to the structural skin of a motor vehicle.

16. The multiple-piece sound transmission barrier system of claim 9, wherein after the lower shell is installed adjacent to the structural skin of a motor vehicle, the lower surface of the first intermediate layer of the upper shell is attached to the upper surface of the separation layer of the lower shell.

17. A method for reducing sound transmitted to a-passenger compartment of a motor vehicle having a structural skin comprising the step of:

placing a sound transmission barrier system adjacent to the structural skin of the motor vehicle, wherein said sound transmission barrier system comprises a plurality of layers with an upper layer having an upper surface and a lower surface formed from a carpet material, a first intermediate layer having an upper surface and a lower surface formed from a high mass base thermoplastic material and attached to the lower surface of the carpet material, a separation layer having an upper surface and a lower surface formed from polyurethane foam and attached to the lower surface of the first intermediate layer, a second intermediate layer having an upper surface and a lower surface formed from a high mass base thermoplastic material and attached to the lower surface of the separation layer and a lower layer having an upper surface and a lower surface formed from polyurethane foam or shoddy or fiberglass and attached to the lower surface of the second intermediate layer.

18. The method of claim 17, wherein the lower surface of the lower layer is attached to the structural skin of the motor vehicle.

19. A method for reducing sound transmitted to a passenger compartment of a motor vehicle having a structural skin, comprising the steps of:

placing a lower shell adjacent to the structural skin of the motor vehicle, said lower shell comprising a separation layer having an upper surface and a lower surface formed from polyurethane foam, a second intermediate layer having an upper surface and a lower surface formed from a high mass base thermoplastic material and attached to the lower surface of the separation layer, and a lower layer having an upper surface and a lower surface formed from polyurethane foam or shoddy or fiberglass and attached to the lower surface of the second intermediate layer; and placing an upper shell adjacent to the lower shell, said upper shell comprising an upper layer having an upper surface and a lower surface said upper layer being formed from a carpet material, and a first intermediate layer having an upper surface and a lower surface formed from a high mass base thermoplastic material and attached to the lower surface of the upper layer, so that the upper surface of the separation layer of the lower shell is in contact with the lower surface of the first intermediate layer.

20. The method of claim 19, wherein the upper shell and the lower shell are attached together.

21. The method of claim 20, wherein the lower surface of the first intermediate layer of the upper shell is attached to the upper surface of the separation layer of the lower shell.

22. The method of claim 19, wherein the lower surface of the lower layer of the lower shell is attached to the structural skin of the motor vehicle.

* * * * *

UNITED STATES PATENT AND TRADEMARK OFFICE
CERTIFICATE OF CORRECTION

PATENT NO. : 5,504,282
DATED : April 2, 1996
INVENTOR(S) : Pizzirusso et al.

It is certified that error appears in the above-indentified patent and that said Letters Patent is hereby corrected as shown below:

In col. 7, line 3, after "0.5 lb/ft$^2$", insert: --of--.

In col. 7, line 57, after "polyurethane foam" delete "was".

In claim 9 (col. 8, line 64), after "separation layer," insert: --and--.

In claim 12 (col. 9, line 11), delete "filter" and insert:--filler--.

In claim 16 (col. 9, line 25), after "motor vehicle," insert:--and--.

Signed and Sealed this

Twentieth Day of August, 1996

Attest:

BRUCE LEHMAN

*Attesting Officer*     *Commissioner of Patents and Trademarks*